Patented Feb. 28, 1933

1,899,513

UNITED STATES PATENT OFFICE

BERNARD LOEWE, OF MILAN, ITALY

REELING-OFF SILK COCOONS

No Drawing. Application filed December 11, 1930, Serial No. 501,661, and in Germany June 10, 1929.

The invention relates to improvements in reeling-off silk cocoons and has for its object a treatment of the cocoons whereby the reeling-off of the same is facilitated and the silk threads obtained therefrom rendered more resistant and better adapted to subsequent use.

It has already been proposed to treat cocoons preliminary to their reeling-off by immersion in a bath consisting of a solution of alkalis or alkaline earths, which treatment may be preceded by a treatment in a bath consisting of a solution of neutral, alkaline or acid salts, mineral or organic acids or oils and to subsequently reel-off in cold water the cocoon threads from which the bast has not been removed by the said treatments.

It has now been discovered that a preliminary treatment of cocoons in a bath consisting of a very weak solution of ammonia or of very weak alkaline solutions, succeeded by a treatment of such pretreated cocoons with caustic alkali in solution achieves excellent results in the reeling-off. The very weak alkaline solutions above referred to may be solutions of the aliphatic amino compounds, for instance methylamin, ethylamin, or the quarternary ammonium bases such as tetramethylammonium with or without the simultaneous addition of one or more organic or inorganic salts, especially those of ammonium or sodium such as ammonium acetate, sodium acetate, ammonium formate, sodium formate, ammonium sulphate, sodium sulphate and the like.

Concentrated solutions of ammonia as well as concentrated solutions of alkali salts or alkaline reacting solutions of salts act at a temperature of 30° C. and below on cocoons to remove the bast thereof and to precipitate it; this action causes a defective reeling-off of the cocoons in cold water and the reeled-off silk has not sufficient coherence on account of the bast having been partially removed.

Very weak solutions of ammonia as well as very weak alkaline solutions with or without the addition of salts of the aforesaid kind however do not remove the bast from the cocoons but form compounds with it in such a way that the threads obtained from the cocoons acquire a greater resistance for the subsequent treatment in caustic alkali solutions; the said weak alkali solutions also precipitate the lime of the more or less hard water employed for the reeling-off of the silk threads and thereby preserve the latter from the undesired and detrimental influence of the lime; the filaments obtained from such threads are consequently of superior quality. The cocoons treated by immersion in the afore-said weak ammonia or alkaline solutions to which are added or not added salts of the kind referred to, are however not adapted to be reeled-off in cold water but are only rendered capable of being so by the subsequent treatment in caustic alkali solutions.

This latter treatment when carried out alone causes the cocoons to be easily reeled-off in cold water, but the silk filaments obtained thereby are not very stable, because when the silk is stored for a longer period, the fibroin of the silk is attacked even when very weak caustic alkali solutions have been employed.

The treatment of the cocoons according to the present invention may be carried out for instance as follows:

The cocoons are first immersed in a weak alkaline reacting solution of ammonia or of amino compounds to which may be added if desired a solution of one or more salts as mentioned before.

It is immaterial and unimportant for the result obtained, whether a solution of ammonia or a solution of amino compounds is chosen, only economical reasons will have to be considered in this connection; the same is true for the addition of one or more organic or mineral salts which act like catalytic agents. Economic reasons will also be decisive for the employment of one or the other or of more of these salts.

Solutions of the aforesaid kind may have the compositions as per the following examples, the proportions of the constituents of the solutions may vary somewhat but in any case the solutions must be weak solutions not exceeding 0.5% and preferably of considerable lower concentration.

*Example 1.*—0.5% ammonia or 0.6% methylamin a. s. o.,

*Example 2.*—0.6% ammonia, 0.6% ammonium acetate, or sodium acetate,

*Example 2'.*—0.5% methylamin, 0.5% ammonium formate or sodium formate,

*Example 3.*—0.6% ammonia, 0.5% ammonium formate or ammonium acetate, 0.5% sodium formate, or sodium acetate,

*Example 3'.*—0.5% tetramethylammoniumhydroxide, 0.5% sodium formate, 0.5% ammonium acetate a. s. o.

The solutions containing one salt and especially those containing a plurality of salts are preferred on account of the property of the salts to act as catalytic agents.

The cocoons are immersed in a bath of any one of these solutions and held therein in conformity with the thickness of their layer of silk for 1 to 12 hours until the solutions have penetrated all the layers of the silk.

The baths may be continuously used for a longer period till they develop a bad smell on account of fermentation processes which take place in the baths, the bad smell rendering the renewal of the bath advisable, although the bath is still effective. Before developing the bad smell, the bath, if desired, may be brought to its original concentration when it shows that the subsequently used caustic alkali bath under the same conditions: concentration, temperature and period of action, decreases in effectiveness. This decreasing is noticed when reeling-off the threads in cold water in that the reeling-off does no longer proceed as easily and evenly as before.

After the cocoons have been treated in the first bath referred to, they are immersed into a bath consisting of a caustic alkali solution of 2° Bé. or less at a temperature of about 30° C. or less for about 10 minutes, whereupon they are reeled-off in fountain water at a temperature of 30° C. or less, that is at room temperature.

Between the first treatment with a solution of ammonia or any other alkaline solution with or without the addition of salts and the second treatment by means of a caustic alkali solution, a treatment with a weak mineral or organic acid, i. e. ½% of formic acid or ¼% hydrochloric acid may be inserted to neutralize free alkali. This treatment with a weak acid assists in loosening the end of the silk threads and increases their durability. After the said treatment with acid the cocoons are not adapted to be reeled off.

The treatment in the caustic alkali solution is preferably carried out in two stages, viz. in two baths of different strength or concentration. For instance, the cocoons are first immersed into a bath of 0.5–0.9° Bé. of sodium- or potassium hydroxide for 10 to 60 minutes and subsequently into a solution of the substances as referred to above but of a density of 1.0 to 1.50° Bé. for a period of ½–5 minutes at a vacuum of 25–50 mm. Hg. It is also possible to first immerse the cocoons into the stronger solution and subsequently into the weaker solution.

Of course as before stated, the cocoons may be immersed only into a single caustic alkali solution of a density up to 2° Bé. depending on the working temperature and on the nature of cocoons to be treated.

Whether the said treatment with caustic alkali solution is carried out in one bath or in stages, that is in two baths of different strength depends on the hardness and the age of the cocoons; in general it is sufficient to have the cocoons treated in a single stage; however when so-called "Doppi" (double cocoons) have to be reeled off or when the cocoons are old or when the killing of the pupæ and drying was carried out at temperatures higher than 80–85° C. it is preferred to work in two stages and to first use the weaker and subsequently the stronger bath. The reverse procedure, that is, to use first the stronger and afterwards the weaker bath will be adopted if cocoons which have not been dried uniformly, have to be rendered uniform, that is if such cocoons have to be equalized for reeling purposes. Under normal conditions the preliminary use of the weaker bath will be preferred because when being treated for a longer time in a stronger bath, the silk layers of the cocoons are loosened and the reeling-off does not proceed so easily and will result in a silk which is not so clean as otherwise.

In order to increase the coherence of the reeled-off filament, which consists of two or more cocoon threads, there may be added to the caustic alkali solution respectively, if this solution is used in two stages, to either or to both of the solutions of different concentration an emulsion consisting of about 3 g. bicarbonate of soda and 40 g. sulphonated castor oil. If desired ¼–½ g. sugar (glucose) may be added to this emulsion for each 100 litres of the caustic alkaline solution. The proportion of the constituents of the said emulsion and of the added sugar may vary according to the nature of the cocoons to be treated. It is preferred to add the emulsion to the weaker caustic alkali solution in case of using differently concentrated solutions.

In order to increase the coherence and the elasticity of the reeled-off silk filaments still to a higher degree than is possible by the addition of the aforesaid emulsion, a weak solution of protein substances, such as egg-albumin, fish-glue and the like may be added in a proportion of 0.2–0.3 g. for each kg. of cocoons either to the preliminary alkaline bath or to the subsequent caustic alkali bath or to both baths with or without sulphonated castor oil and glycerine.

The weaker bath of caustic alkali solution may be continuously used for a long time and from time to time it is brought to the original concentration in order to maintain the time of immersion of the cocoons as constant as possible. If the bath decreases in concentration the time of immersion of the cocoons should accordingly be prolonged.

It is recommendable to prove the concentration and temperature of the stronger bath at intervals, say at the end of each day's work and to regenerate it to the original concentration in order to maintain equal working conditions. When the baths get dirty on account of the dust etc. of the cocoons, a complete removal of the baths should be carried out.

After the treatment in the last bath the cocoons should not be washed in a solution of an acid nor reeled-off in water of acid reaction, because otherwise the bast of the cocoons which has been rendered soft and sticky would coagulate and the reeling-off would meet with difficulties; the silk reeled-off furthermore would not have sufficient coherence.

In order to remove or render ineffective the free alkali or caustic alkali without washing the treated cocoons with acid but in reeling them off in clean water, it is advisable to remove by vacuum the liquids absorbed by the cocoons during the enumerated treatments in the baths prior to the reeling-off. This removal has the further advantage that the cocoon is made lighter in weight and that the elasticity of the finished thread is increased.

The process according to the invention may for the instance be carried out as follows:

5 kg. of cocoons are immersed during five hours in one or the other of the following baths consisting of 100 litres water and 60 cm$^3$ ammonia of 28° Bé.

or 100 litres water, 60 cm$^3$ ammonia of 28° Bé. and 50 g. sodium acetate or 100 litres water, 60 cm$^3$ ammonia of 28° Bé. 50 g. sodium acetate and 50 g. ammonium formate.

Thereupon the cocoons are treated during 10 minutes in a bath consisting of 100 litres sodiumhydroxide of 1.2° Bé. at a vacuum of 25 to 50 mm. mercury, and then reeled-off in cold water.

The presence of vacuum or pressure during the treatment in the baths assists the uniform action of the baths unto all layers of the cocoons to their interior and renders them also more adapted to uniformly take up the water in the spinning or reeling-off basin. By the action of vacuum or pressure the immersion of the cocoons into water during a considerable space of time prior to the reeling-off is avoided, which procedure otherwise is often necessary for obtaining equalization of the cocoons.

After the treatment in the alkaline bath and prior to the treatment in the caustic alkali bath, the cocoons may be washed if desired in a solution consisting of 100 litres water and 60 cm$^3$ hydrochloric acid of a concentration of 37% or in a solution of 100 litres water and 50 cm$^3$ acetic acid of a concentration of 99–100%.

As aforementioned the treatment in the caustic alkali bath may be carried through in two solutions of different concentration; in this connection it may be proceeded with in the following manner. The cocoons coming from the alkaline bath are consecutively introduced in small batches of 50–200 g. in a solution of about 5 litres sodiumhydroxide of 0.9° Bé. contained in small autoclaves and treated therein for about 15 minutes, whereupon they are treated in a second solution of sodiumhydroxide of 1.2° Bé. under vacuum of about 25–50 mm. mercury for two or three minutes. As an alternative, the cacoons may first be introduced into the stronger solution and subsequently into the weaker solution. After the treatment just described, the cocoons are reeled off in cold water.

Examples of emulsions adapted to increase the coherence of the thread are the following:

57 cm$^3$ water
    3 g. bicarbonate of soda and
    40 cm$^3$ sulphonated castor oil or 56½ cm$^3$ water
    ½ g. sugar
    3 g. bicarbonate of soda and
    40 g. sulphonated castor-oil.

The above indicated quantities of emulsions are suitable for and are added to each 100 litres sodiumhydroxide.

When introducing in the alkaline baths for each 5 kg. cocoons for instance a solution consisting of 15 g. fish glue
    40 cm$^3$ ammonia 28° Bé.
    45 cm$^3$ water or in the caustic alkaline baths a solution consisting of 15 g. fish glue
    10 cm$^3$ sodium hydroxide 35° Bé.
    75 cm$^3$ water in the proportion of 100 cm$^3$ per 100 litres of the treating bath, a superior coherence of the threads and filaments respectively is secured.

The composition of the above solution may vary in a multiple way; for example solutions consisting of 15 g. fish-glue
40 cm³ ammonia 28° Bé.
10 cm³ sulphonated castor-oil
35 cm³ water
or
15 g. fish-glue
40 cm³ ammonia 28° Bé.
10 cm³ sulphonated castor-oil
1 cm³ glycerin and
34 cm³ water that is to say, solutions, which beside protein substances, contain also sulphonated castor-oil and water, and/or glycerin, have proved very satisfactory.

Should the above named solutions for improving the coherence of the thread be added to the caustic alkali baths and not to the alkaline baths, the ammonia contained in the solution is to be replaced by 10 cm³ of hydroxide of sodium or potassium of 35° Bé.

A superior coherence is also secured when adding to the water in the reeling-off basin a solution of protein substances, for example a solution comprising ½–5 g. fish-glue and 200 cm³ sodiumhydroxide of 1° Bé. The above quantity of protein solution is sufficient for 15–20 litres water at room temperature.

What I claim as my invention and desire to secure by Letters Patent is:

1. A method of treating silk worm cocoons consisting in first treating the cocoons in a preliminary bath of a weak solution of a basic ammonium compound of a concentration below 0.5% continuing this preliminary bath until this solution has penetrated all layers of silk of the cocoons and then treating them with a caustic alkali solution of a concentration up to 2° Bé. at room temperature for at least a minute, then reeling off the cocoons in water at room temperature.

2. A method of treating silk worm cocoons consisting in first treating the cocoons in a preliminary bath of a watery colution of an alkaline ammonium compound of a concentration below 0.5% to which is added at least one salt adapted to act as a catalytic agent, continuing this preliminary bath until this solution has penetrated all layers of silk of the cocoons and then treating them with a causitc alkali solution of a concentration up to 2° Bé. at room temperature for at least a minute, then reeling off the cocoons in water at room temperature.

3. A method of treating silk worm cocoons consisting in first treating the cocoons in a preliminary bath of a weak solution of a basic ammonium compound of a concentration below 0.5% continuing this preliminary bath until this solution has penetrated all layers of silk of the cocoons then washing them with a weak acid solution adapted to neutralize the alkali not bound to the bast of the cocoons, then treating them with a caustic alkali solution of a concentration up to 2° Bé. at room temperature for at least a minute, then reeling off the cocoons in water at room temperature.

4. A method of treating silk worm cocoons consisting in first treating the cocoons in a preliminary bath of a watery solution of an alkaline ammonium compound of a concentration below 0.5%, to which is added at least one salt adapted to act as catalytic agent, continuing this preliminary treatment until the bath has penetrated all layers of silk of the cocoons, then washing them with a diluted acid adapted to neutralize the alkali not bound to the bast of the cocoons, then treating the washed cocoons with a caustic alkali solution of a concentration up to 2° Bé. at room temperature for at least a minute, then reeling off the cocoons in water at room temperature.

5. A method of treating silk worm cocoons consisting in first treating the cocoons in a preliminary bath of a watery solution of an alkaline ammonium compound of a concentration below 0.5% continuing this preliminary bath until this solution has penetrated all layers of silk of the cocoons and treating them at room temperature in a caustic alkali solution, which is subdivided into a plurality of baths, each of the said baths differing in concentration from the others and none of them surpassing a concentration of 2° Bé. for a total period of time of at least a minute, then reeling off the cocoons in water of room temperature.

6. A method of treating silk worm cocoons consisting in first treating the cocoons in a preliminary bath of a watery solution of an alkaline ammonium compound of a concentration below 0.5% to which is added at least one salt adapted to act as a catalytic agent, continuing this preliminary treatment until the bath has penetrated all layers of silk of the cocoons, then treating them at room temperature in a caustic alkali solution, which is subdivided into a plurality of baths, each of said baths differing in concentration from the others and none of them surpassing a concentration of 2° Bé. for a total period of time of at least a minute, then reeling off the cocoons in water of room temperature.

7. A method of treating silk worm cocoons consisting in first treating the cocoons in a preliminary bath of a watery solution of an alkaline ammonium compound of a concentration below 0.5% continuing this preliminary bath until this solution has penetrated all layers of silk of the cocoons, then washing them with a weak acid solution adapted to neutralize the alkali not bound to the bast of the cocoons, then treating them at room temperature in a caustic alkali solution, which is subdivided into a plurality of baths, each of the said baths differing in concentration from the others and none of them surpassing a concentration of 2° Bé. for a total period of time of at least a minute, then reeling off the cocoons in water of room temperature.

8. A method of treating silk worm cocoons consisting in first treating the cocoons in a preliminary bath of a watery solution of an alkaline ammonium compound of a concentration below 0.5%, to which is added at least one salt adapted to act as catalytic agent, continuing this preliminary treatment until the bath has penetrated all layers of silk of the cocoons, then washing them with a diluted acid adapted to neutralize the alkali not bound to the bast of the cocoons, then treating them at room temperature in a caustic alkali solution, which is subdivided into a plurality of baths, each of the said baths differing in concentration from the others and none of them surpassing a concentration of 2° Bé. for a total period of time of at least a minute, then reeling off the cocoons in water of room temperature.

9. A method of treating silk worm cocoons as claimed in claim 1 in which the caustic alkali solution contains at least a substance adapted to increase the coherence of the silk filaments.

10. A method of treating silk worm cocoons as claimed in claim 1, in which at least one of the treating liquids including the water for reeling up the threads contains substances adapted to increase the elasticity and coherence of the silk filaments of the threads.

11. A method of treating silk worm cocoons as claimed in claim 1, in which the treatment in the solutions is conducted in the presence of a pressure other than atmospheric pressure.

12. A method as claimed in claim 5 in which at least one of the caustic alkali solution baths contains substances adapted to increase the coherence of the silk filaments.

13. A method as claimed in claim 5 in which at least one of the treating liquids including the water for reeling up the threads contains substances adapted to increase the coherence of the silk filaments.

14. A method as claimed in claim 5 in which the treatment in the solutions is conducted in the presence of a pressure other than atmospheric pressure.

15. A method as claimed in claim 1 in which the cocoons after their last chemical treatment and prior to their reeling off are subjected to the action of vacuum to free them from absorbed solutions.

In testimony whereof I affix my signature.

BERNARD LOEWE.